United States Patent
Schultz et al.

(10) Patent No.: US 11,237,562 B2
(45) Date of Patent: Feb. 1, 2022

(54) SYSTEM AND METHOD FOR AVOIDING CONTACT BETWEEN AUTONOMOUS AND MANNED VEHICLES CAUSED BY LOSS OF TRACTION

(71) Applicant: CATERPILLAR INC., Peoria, IL (US)

(72) Inventors: Eric John Schultz, Metamora, IL (US); Karl Arthur Kirsch, Chillicothe, IL (US); Philip Carl Wallstedt, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 309 days.

(21) Appl. No.: 16/575,521

(22) Filed: Sep. 19, 2019

(65) Prior Publication Data
US 2021/0089039 A1 Mar. 25, 2021

(51) Int. Cl.
*G05D 1/02* (2020.01)
*G05D 1/00* (2006.01)
(Continued)

(52) U.S. Cl.
CPC .......... *G05D 1/0214* (2013.01); *B60W 30/09* (2013.01); *G05D 1/0088* (2013.01);
(Continued)

(58) Field of Classification Search
CPC .......... A63F 2300/64; B60G 2400/822; B60G 2400/823; B60G 2800/21; B60G 2800/93;
(Continued)

(56) References Cited

U.S. PATENT DOCUMENTS

| | | |
|---|---|---|
| 6,393,362 B1 | 5/2002 | Burns |
| 7,079,943 B2 | 7/2006 | Flann et al. |

(Continued)

FOREIGN PATENT DOCUMENTS

WO  WO-2017100797 A1 * 6/2017 ......... G01C 21/3694

*Primary Examiner* — Christian Chace
*Assistant Examiner* — Katherine Marie Fitzharris
(74) *Attorney, Agent, or Firm* — Finnegan, Henderson, Farabow, Garrett & Dunner, LLP (57) ABSTRACT

A control system for preventing vehicle collisions may include a vehicle location determination module, a terrain determination module, a terrain surface coefficient of friction estimation module, and a sensing system configured to generate signals indicative of vehicle speed, vehicle pose, vehicle size, vehicle weight, vehicle tire type, vehicle load, vehicle gear ratio, weather characteristics, and road conditions for a vehicle operating at a job site. A manned vehicle trajectory determination module may receive location information and plot a first travel path for a manned vehicle based at least in part on a location, heading, and speed of the manned vehicle and a desired destination for the manned vehicle. An autonomous vehicle trajectory determination module may receive location information, terrain information, and terrain surface coefficient of friction information, plot a second travel path for an autonomous vehicle, and determine projected slide trajectories for the autonomous vehicle at successive positions along the second travel path where the autonomous vehicle is predicted to lose traction based at least in part on signals received from the sensing system.

20 Claims, 2 Drawing Sheets

(51) Int. Cl.
  *B60W 30/09* (2012.01)
  *G06N 20/00* (2019.01)

(52) U.S. Cl.
  CPC ............ *G05D 1/0221* (2013.01); *G06N 20/00* (2019.01); *B60W 2400/00* (2013.01); *B60W 2520/125* (2013.01); *B60W 2552/15* (2020.02); *G05D 2201/0213* (2013.01)

(58) Field of Classification Search
  CPC ....... B60G 2800/95; B60K 28/16; B60L 3/10; B60R 21/01013; B60R 2021/01304; B60R 21/0132; B60R 2300/301; B60T 8/1708; B60T 8/1755; B60T 8/1763; B60T 8/4809; B60T 2201/02; B60T 2210/01; B60T 2230/02; B60W 30/08; B60W 30/095; B60W 40/06; B60W 2552/40; B60W 60/0027; B60Y 2300/08; B60Y 2300/09; B60Y 2300/18175; B62D 6/006; G01S 13/93; G01S 13/931; G01S 2013/932; G01S 2013/9322; G01S 17/93; G01S 17/931; G01S 2205/002; G01S 5/0072; G05B 2219/31003; G05B 2219/36468; G05B 2219/40507; G05B 2219/40512; G05B 2219/41139; G05D 1/0212; G05D 1/0213; G05D 1/0289; G08G 1/16; G08G 9/02; G06K 9/00798
  See application file for complete search history.

(56) References Cited

U.S. PATENT DOCUMENTS

| | | |
|---|---|---|
| 8,660,734 B2 | 2/2014 | Zhu et al. |
| 9,507,346 B1 | 11/2016 | Levinson et al. |
| 9,916,703 B2 | 3/2018 | Levinson et al. |
| 2004/0122580 A1 | 6/2004 | Sorrells |
| 2011/0153080 A1 | 6/2011 | Shapiro et al. |
| 2012/0290146 A1* | 11/2012 | Dedes ................ G01C 21/3697 701/1 |
| 2018/0005053 A1 | 1/2018 | Browning et al. |
| 2018/0356819 A1* | 12/2018 | Mahabadi ............ B60W 30/09 |
| 2019/0072966 A1 | 3/2019 | Zhang et al. |

\* cited by examiner

SYSTEM AND METHOD FOR AVOIDING CONTACT BETWEEN AUTONOMOUS AND MANNED VEHICLES CAUSED BY LOSS OF TRACTION

TECHNICAL FIELD

The present disclosure relates generally to avoiding potential collisions between autonomous and manned vehicles and, more particularly, to a system and method for avoiding contact between autonomous and manned vehicles caused by loss of traction.

BACKGROUND

Machines such as, for example, on and off-highway haul trucks, and other types of heavy equipment and vehicles are used to perform a variety of tasks. The various types of machines operating at any one time at a particular job site may include manned machines, semi-autonomous machines, and fully autonomous machines. These different types of machines are often operating along paths of travel that may run adjacent each other or in close proximity to each other, for example, as hauling machines such as dump trucks and loading machines such as front end loaders travel near each other on their way to and from digging, loading, and processing sites (such as rock crushers) for the performance of various tasks at a job site. This traveling can include traversing one of many possible paths at a job site. The paths traversed by the machines may include unpredictable surface conditions caused by weather conditions, usage patterns, machine load losses, natural disasters, tectonic shifts, mud slides, rock slides, and/or other deteriorative events and/or processes. Roadways that are rendered unpredictable may have unpredictable portions, which may include, for example, ice, mud, sand, loose gravel, standing water, or other combinations of surface characteristics leading to soft underfoot conditions. Off-highway machines operating at job sites, such as oil sands mining sites in particular, are often subject to soft underfoot conditions, including surfaces that are loose and viscous, forcing trucks and other machines to modify driving behavior on the fly. The ability to make timely modifications to operating characteristics and driving behavior for the off-highway machines operating under these conditions is largely dependent on predicting and identifying the presence of various types of roadway conditions such as soft underfoot conditions and potential slippage or other behavior of the different types of machines operating in the vicinity of each other. Unpredictable portions of a job site may increase time and/or costs associated with traveling between two or more locations, as well as increasing the risk of the trajectories of two machines crossing, resulting in potential collisions. A machine may traverse a portion of a job site, find that the surfaces in that portion include standing water or other conditions resulting in especially viscous or soft conditions, and be re-routed along another one of the possible paths. Moreover, as multiple machines traverse the same paths at a job site, soft underfoot conditions may worsen as ruts formed by each machine are repeatedly traversed by other machines. Re-routing machines at a job site may increase time and/or costs associated with traveling between two or more locations. The unpredictable portions with soft underfoot conditions may also disable the machine. For example, the machine may slip, get stuck, deplete its energy (e.g., fuel or electric charge), crash, or otherwise be disabled by the unpredictable portions.

One way to minimize the effect of unpredictable portions of roadways is to facilitate communications between machines and/or remote offices regarding the unpredictable portions. An example of facilitating communications between machines and/or remote offices is described in U.S. Patent Application Publication No. 2004/0122580 (the '580 publication) by Sorrells, published on Jun. 24, 2004. The '580 publication describes a control module, which determines if a machine is operating on a road having an adverse road condition. Adverse road conditions include soft underfoot conditions, steep grades, and potholes. Additionally, the '580 publication describes updating a site map stored in the control module or a remote office to show the adverse road condition. The '580 publication also describes using the control module or the remote office to notify an operator of the machine that the machine is approaching the adverse road condition. Additionally, the '580 publication describes using the control module or the remote office to dispatch a machine to the location of the adverse road condition for the purpose of correcting the adverse road condition.

However, the '580 publication does not provide a solution for actually predicting the trajectory of a machine such as an autonomously or semi-autonomously operated machine as a result of loss of traction, with the trajectory resulting in a potential collision with another machine traveling on a nearby path. Moreover, the '580 publication does not provide a system and method for controlling the autonomously or semi-autonomously operated machine to maximize speed and productivity of the autonomous machine while minimizing the risk of collision with another vehicle, and particularly with a manned vehicle traveling along an adjacent path while completing of its designated tasks.

The present disclosure is directed to overcoming one or more of the problems set forth above and/or other problems in the art.

SUMMARY

In one aspect, the present disclosure is directed to a control system for preventing vehicle collisions. The control system may include a vehicle location information determination module, a terrain determination module, a terrain surface coefficient of friction estimation module, and a sensing system configured to generate signals indicative of data representing one or more of vehicle speed, vehicle pose, vehicle size, vehicle weight, vehicle tire type, vehicle load, vehicle gear ratio, weather characteristics, and road conditions for a vehicle operating at a job site. A manned vehicle trajectory determination module may be configured to receive location information from the vehicle location information determination module and plot a first travel path for a manned vehicle based at least in part on a location, heading, and speed of the manned vehicle and a desired destination for the manned vehicle. An autonomous vehicle trajectory determination module may be configured to receive location information from the vehicle location information determination module, terrain information from the terrain determination module, and terrain surface coefficient of friction information from the terrain surface coefficient of friction estimation module, plot a second travel path for an autonomous vehicle from a location of the autonomous vehicle to a desired destination for the autonomous vehicle, and determine projected slide trajectories for the autonomous vehicle at successive positions along the second travel path where the autonomous vehicle is predicted to lose traction based at least in part on signals received from the sensing system. A comparison module may be configured to determine if any of the projected slide trajectories for the autonomous vehicle conflict with simultaneous positions of the manned vehicle traveling along the first travel path. An autonomous vehicle command control module may be configured to change an operating characteristic of the autonomous vehicle if the comparison module identifies any potential contact between the autonomous vehicle and the manned vehicle.

In another aspect, the present disclosure is directed to a method for preventing vehicle collisions. The method may include determining a vehicle location, using a vehicle location information determination module, determining a terrain on which the vehicle is operating, using a terrain determination module, estimating a terrain surface coefficient of friction, using a terrain surface coefficient of friction estimation module, and generating signals indicative of data representing one or more of vehicle speed, vehicle pose, vehicle size, vehicle weight, vehicle tire type, vehicle load, vehicle gear ratio, weather characteristics, and road conditions for a vehicle operating at a job site, using a sensing system. The method may also include receiving location information of a manned vehicle from the vehicle location information determination module and plotting a first travel path for the manned vehicle based at least in part on a location, heading, and speed of the manned vehicle and a desired destination for the manned vehicle, using a manned vehicle trajectory determination module, receiving location information of an autonomous vehicle from the vehicle location information determination module, terrain information from the terrain determination module, and terrain surface coefficient of friction information from the terrain surface coefficient of friction estimation module, plotting a second travel path for the autonomous vehicle from a location of the autonomous vehicle to a desired destination for the autonomous vehicle, and determining projected slide trajectories for the autonomous vehicle at successive positions along the second travel path where the autonomous vehicle is predicted to lose traction based at least in part on signals received from the sensing system, using an autonomous vehicle trajectory determination module. The method may still further include determining if any of the projected slide trajectories for the autonomous vehicle conflict with simultaneous positions of the manned vehicle traveling along the first travel path, using a comparison module, and changing an operating characteristic of the autonomous vehicle if the comparison module identifies any potential contact between the autonomous vehicle and the manned vehicle, using an autonomous vehicle command control module.

In another aspect, the present disclosure is directed to a computer-readable medium for use in preventing collisions between an autonomous vehicle and a manned vehicle traveling along adjacent, curved travel paths at a job site, the computer-readable medium including computer-executable instructions for performing a method that may include determining locations of the autonomous vehicle and the manned vehicle, using a vehicle location information determination module, determining a terrain on which the autonomous vehicle is operating, using a terrain determination module, estimating a terrain surface coefficient of friction for the autonomous vehicle, using a terrain surface coefficient of friction estimation module, and generating signals using a sensing system, the signals being indicative of data representing one or more of autonomous vehicle physical and operating characteristics including speed, pose, size, weight, tire type, load, gear ratio, weather characteristics, and road conditions for the travel path along which the autonomous vehicle is operating. The method may also include receiving location information for the manned vehicle from the vehicle location determination module and plotting a first travel path for the manned vehicle based at least in part on the location, heading, and speed of the manned vehicle and a desired destination for the manned vehicle, using a manned vehicle trajectory determination module, receiving location information for the autonomous vehicle from the vehicle location determination module, terrain information from the terrain determination module, and terrain surface coefficient of friction information from the terrain surface coefficient of friction estimation module, plotting a second travel path for the autonomous vehicle from a location of the autonomous vehicle to a desired destination for the autonomous vehicle, and determining projected slide trajectories for the autonomous vehicle at successive positions along the second travel path where the autonomous vehicle is predicted to lose traction based at least in part on signals received from the sensing system, using an autonomous vehicle trajectory determination module. The method may still further include determining if any of the projected slide trajectories for the autonomous vehicle conflict with simultaneous positions of the manned vehicle traveling along the first travel path, using a comparison module, and changing an operating characteristic of the autonomous vehicle if the comparison module identifies any potential contact between the autonomous vehicle and the manned vehicle, using an autonomous vehicle command control module.

DETAILED DESCRIPTION

Figure 1:
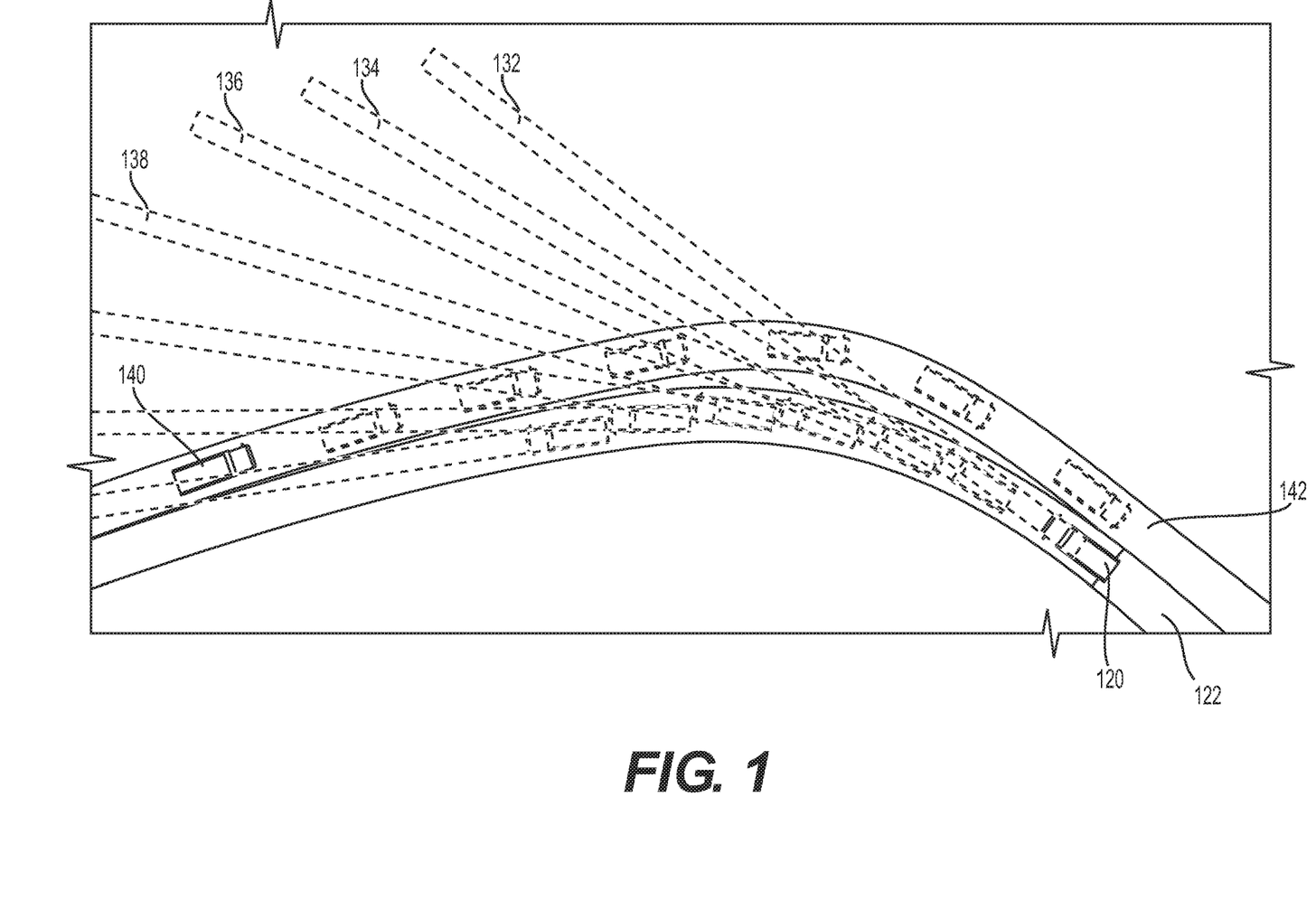
FIG. 1 is a schematic illustration of exemplary vehicles operating at a job site, with projected slip trajectories for an autonomous vehicle crossing a path of a manned vehicle.

FIG. 1 illustrates an exemplary implementation of a system and method according to this disclosure with a first autonomous vehicle 120 traveling along a first curved path 122 in a first direction, as shown from the right hand side of FIG. 1 toward the left hand side. An exemplary manned vehicle 140 is also traveling along a second curved path 142 extending adjacent to first path 122, with manned vehicle 140 traveling in a second direction essentially opposite to the first direction, as shown from the left hand side of FIG. 1 toward the right hand side. The two exemplary, curved and adjacent paths 122, 142 may be located at a job site, such as an oil sands location, or other mining location or work site. Autonomous vehicle 120 and manned vehicle 140 may be, for example, an off-highway truck, a mining shovel, a wheel loader, a track loader, a backhoe, a hydraulic excavator, or any other type of machine known in the art. Each vehicle 120, 140 may include a chassis supported by a pair of front wheels and a pair of rear wheels. At least the front wheels may be steerable, and the chassis may include front and rear frame portions that may be capable of relative articulation. In various alternative implementations, each of vehicles 120, 140 may include an on-board operator station, which may provide accommodations for an operator and also may house control equipment that enables each vehicle to be operated manually, remotely, semi-autonomously, or fully autonomously.

As shown in the exemplary implementation of FIG. 1, manned vehicle 140 may travel along known path 142, based on one or more of an operator's knowledge of a desired path from one point at a work site to another point, physical markings along the desired path, instructions received in an operator's cabin of vehicle 140 via wired or wireless communications of current geographical positions and directional headings to follow along the desired path, a display such as a virtual reality display or augmented reality display in the operator's cabin showing a representation of the manned vehicle traveling along the desired path in real time, etc. Manned vehicle 140 may perform some type of operation associated with an industry such as mining, construction, farming, freighting, or another industry. Although manned vehicle 140 may be designed to operate with a human operator, alternative implementations may include autonomous or semi-autonomous vehicles designed to operate without an operator. In any case, each of the machines may be, for example, an on or off-highway haul truck, or another type of equipment, which may haul a load material. Vehicle 120, 140 may be a motor grader, an excavator, a dozer, a water truck, or another type of equipment, which may repair paths 122, 142.

A worksite including paths 122, 142 may be, for example, a mine site, a landfill, a quarry, a construction site, a logging site, a road worksite, or any other type of worksite. In an exemplary implementation, vehicles 120, 140 may travel between locations at an oil sands mining site, and may encounter soft underfoot conditions often experienced at oil sands mining sites. The roadways at an oil sands mining site may at times be rendered unpredictable by for example, weather conditions, usage patterns, machine load losses, natural disasters, tectonic shifts, mud slides, rock slides, and/or other deteriorative events and/or processes. These roadways may include unpredictable portions, which may increase time and/or costs associated with traveling between locations. Additionally, the unpredictable portions may disable vehicles by, for example, causing vehicles to slip, get stuck, deplete their energy (e.g., fuel or electric charge), or crash. Some of the unpredictable portions of paths 122, 142 at an oil sands location may include soft underfoot condition portions, iced portions, wet portions, or portions with oil or other slippery materials, which may cause vehicles to experience significant wheel slip and/or rolling resistance, or to lose traction with the ground surface. Each location along paths 122, 142 with conditions that affect traction of one of vehicles 120, 140 may or may not affect a heading and/or location of the vehicle. For example, a soft underfoot condition may cause the vehicle to fishtail, irregularly accelerate (accelerate slower than expected), or irregularly decelerate (decelerate slower than expected). Alternatively or additionally, the soft underfoot or other road surface condition may cause one or more traction devices of the vehicle to rotate irregularly (faster or slower than expected), or result in the vehicle experiencing unacceptable or undesirable changes in pitch rate, yaw rate, and/or roll rate.

Soft underfoot conditions or other road surface conditions conducive to slippage of a work vehicle may be identified by an operator of a particular machine such as manned vehicle 140, or by sensors associated with autonomous vehicle 120. With manned vehicle 140, identification of surface conditions that may affect the trajectory of manned vehicle 140 may be based on the operator's experiences when operating the same or similar machines due to various sensory inputs to the operator such as force feedback (generally referred to as haptic feedback) through various controls and/or an operator seat, visual feedback, auditory feedback, and proprioceptive feedback. Alternatively or in addition, surface conditions such as soft underfoot conditions may be identified without any operator input, such as by comparisons of values for various signals received from sensors to predetermined threshold values. Each vehicle 120, 140 may include a loss of traction response system configured to predict, identify, avoid, and/or minimize the effects of underfoot condition portions of a travel path that may affect the trajectory of the vehicle by changing ways in which the machine operates. An exemplary purpose of a system according to various embodiments of this disclosure may be to maximize the speed and productivity of autonomous vehicle 120 while minimizing any risk of collision with manned vehicle 140.

In the exemplary implementation illustrated in FIG. 1, manned vehicle 140 is assumed to be controlled by an operator to follow predetermined path 142 in a known manner, and autonomous vehicle 120 is made aware of the path 142 being traveled by manned vehicle 140, as well as the projected positions of manned vehicle 140 along path 142 at each of predetermined time intervals. The communication of real time data indicative of the location, speed, and heading of manned vehicle 140 to autonomous vehicle 142 may be similarly implemented for additional manned or autonomous vehicles operating in the vicinity of operation of autonomous vehicle 120. The planned location, speed, and trajectory of autonomous vehicle 120 at each of successive points in time as autonomous vehicle 120 travels along path 122 may also be programmed into an autonomous vehicle command control module 240.

As shown in FIG. 1, variable factors such as vehicle characteristics, weather characteristics, and road surface conditions may affect terrain surface coefficient of friction values along path 122 for autonomous vehicle 120. As a result, a speed of autonomous vehicle 120 and the radius of curvature of path 122 at each of a plurality of successive points along travel path 122 may result in a lateral acceleration of autonomous vehicle 120 equal to the square of autonomous vehicle speed ($V^2$) divided by the radius of curvature (R). The lateral acceleration of autonomous vehicle 120 as it travels along curved path 122 may exceed a lateral acceleration at which autonomous vehicle 120 loses traction with the surface and slides along a slide trajectory 132, 134, 136, 138. Each slide trajectory from a point at which autonomous vehicle 120 is predicted to lose traction with a surface of path 122 is essentially tangent to the directional heading of autonomous vehicle 120 at the moment it loses traction. As shown in FIG. 1, each of these projected slide trajectories may be approximated according to implementations of this disclosure as an elongated "slip polygon," which has an approximate width based on dimensions of the vehicle, and an approximate length corresponding to the distance autonomous vehicle 120 will slide based on factors that include vehicle speed, vehicle characteristics, weather characteristics, and road surface conditions.

Figure 2:
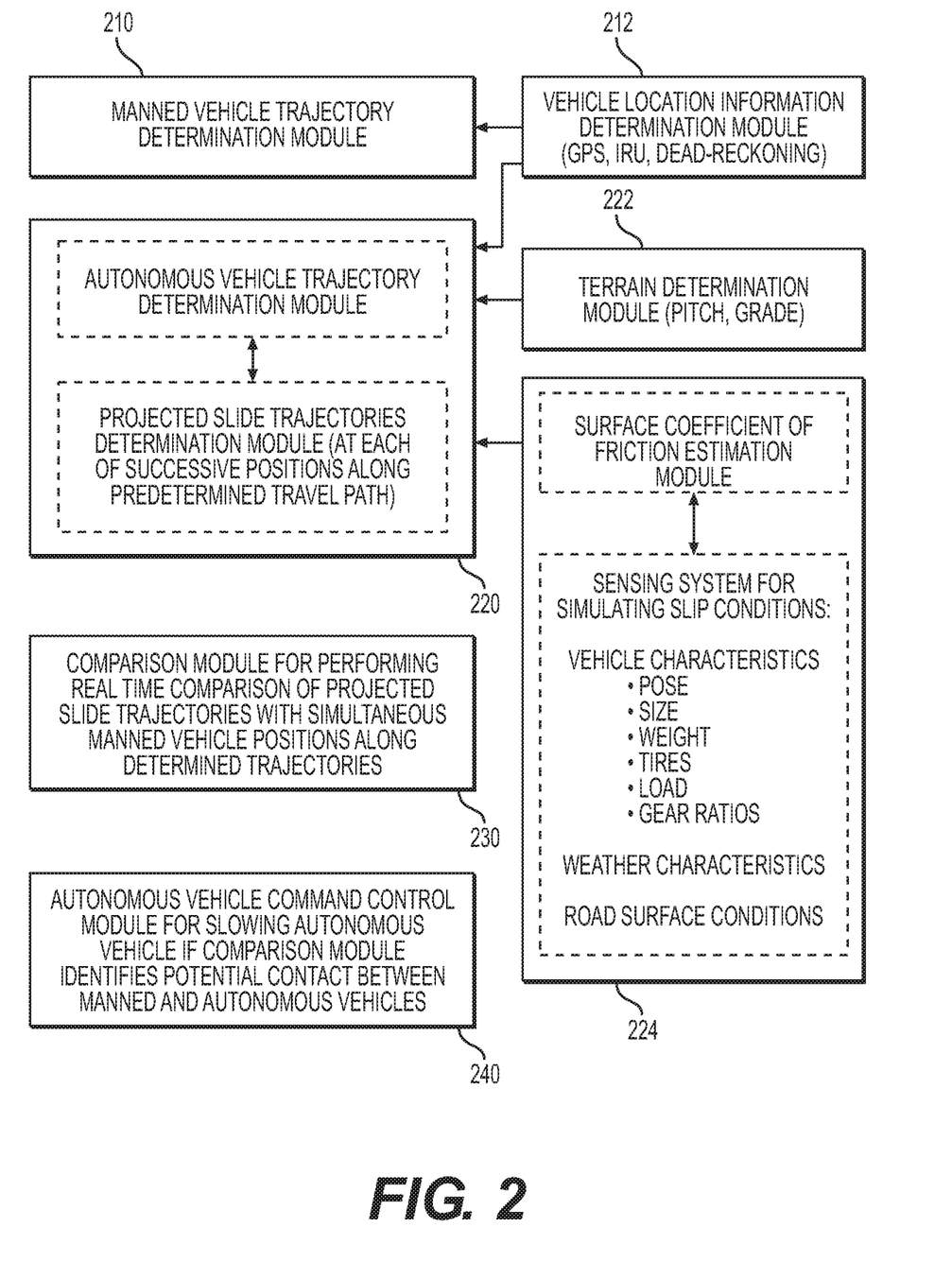
FIG. 2 is a block diagram of an exemplary system according to an embodiment of this disclosure.

FIG. 2 is an illustration of a system according to an exemplary embodiment of this disclosure for utilizing real-time data for predictive analysis of potential interactions between autonomous vehicle 120 traveling along curved path 122 and manned vehicle 140 traveling along curved path 142 adjacent to second curved path 142. The system may include a vehicle location information determination module 212, which is configured to receive data from a series of sensors such as Global Positioning System (GPS) receivers, Inertial Reference Units (IRU), Inertial Measurement Units (IMU), Dead-Reckoning Navigation units, RADAR, LIDAR, and the like. Additionally, the system may include a terrain determination module 222 configured for determining characteristics of the terrain over which the vehicles are traveling, such as pitch and grade. Real time data may also be provided by a terrain surface coefficient of friction estimation module 224, which is configured to receive data from a sensing system, wherein the data is representative of various vehicle characteristics, weather characteristics, or road surface conditions that may contribute to slip conditions and affect the behavior of one or both of manned vehicle 140 and autonomous vehicle 120 as the vehicles travel along paths 142, 122.

In one exemplary embodiment of this disclosure, the sensing system associated with terrain surface coefficient of friction estimation module 224 may be configured to generate signals indicative of characteristics of autonomous vehicle 120 that may affect whether the vehicle slips at any particular point in time or position as it travels along travel path 122. These autonomous vehicle characteristics may include, for example, vehicle speed, vehicle pose, vehicle size, vehicle weight, the types and conditions of the vehicle tires, vehicle loads, and current gear ratios of a drive train for the vehicle. The sensing system may also be configured to generate signals indicative of weather characteristics at the time that may affect slippage of the vehicle, such as ambient temperature, humidity, rain, wind, ice, snow, etc. The sensing system may be still further configured to generate signals indicative of road surface conditions, such as those discussed above, leading to soft underfoot conditions, and other road surface conditions contributing to slippage of autonomous vehicle 120 as it travels along path 122.

Data on the geographic location of manned vehicle 140 may be provided in real time to manned vehicle trajectory determination module 210 and to autonomous vehicle trajectory determination module 220. In various embodiments, vehicle location information determination module 212 may be included as part of an off-board central processing system, or as part of an on-board processing system, with sensors such as one or more GPS receivers mounted directly on one or both of manned vehicle 140 and autonomous vehicle 120. Manned vehicle trajectory determination module 210 may also be configured to receive real time input that shows the position of manned vehicle 140 on a map of a work site, including the position of manned vehicle 140 relative to other job site characteristics such as hazards, fixed obstacles, and updated changes to terrain, as provided by terrain determination module 222.

The system including manned vehicle trajectory determination module 210 and autonomous vehicle trajectory determination module 220, as illustrated in FIG. 2, may additionally or alternatively include any combination of processing modules configured to receive signals indicative of characteristics and conditions that may affect trajectories for both manned vehicle 140 and autonomous vehicle 120. As shown in FIG. 2, the sensors may include location sensors such as GPS, IMU, RADAR, LIDAR, and other sensors providing real time data on the positions of manned vehicle 140 and autonomous vehicle 120. Additional sensors may provide signals indicative of the pitch and grade of the terrain along which paths 122, 142 traverse, and signals indicative of characteristics of the vehicles, weather characteristics, and road surface conditions that may affect the potential slide trajectories 132, 134, 136, 138 of autonomous vehicle 120 if autonomous vehicle 120 exceeds a lateral acceleration limit value ($\alpha$), above which slippage of the vehicle is likely to occur.

In one exemplary embodiment, the various sensors may be configured to output data in an analog format. In another embodiment, the sensors may be configured to output data in a digital format. For example, the same measurements of pitch, grade, vehicle characteristics, weather characteristics, or road surface conditions may be taken in discrete time increments that are not continuous in time or amplitude. In still another embodiment, the sensors may be configured to output data in either an analog or digital format depending on the sampling requirements of manned vehicle trajectory determination module 210 and autonomous vehicle trajectory determination module 220.

The sensors can be configured to capture output data at split-second intervals to effectuate "real time" data capture. For example, in one embodiment, the sensors can be configured to generate thousands of data readings per second. It should be appreciated, however, that the number of data output readings taken by a sensor may be set to any value as long as the operational limits of the sensor and the data processing capabilities of the various modules are not exceeded.

As shown in FIG. 2, in one embodiment, a comparison module 230 may be configured for performing real time comparisons of projected slide trajectories 132, 134, 136, 138 with simultaneous manned vehicle positions along predetermined travel path 142. The purpose of the comparisons performed by comparison module 230 may be to determine potential conflicts between slide trajectories of autonomous vehicle 120 and positions of manned vehicle 140 as it travels along path 142. In some alternative embodiments, comparison module 230 may receive information on projected real time positions of manned vehicle 140 and information on projected slide trajectories 132, 134, 136, 138 of autonomous vehicle 120 for a wide range of potential conditions. One or more of the modules shown in FIG. 2 may include a virtual system modeling engine configured to generate a large number of potential scenarios for the trajectories of manned vehicle 140 and autonomous vehicle 120 under a large number of different conditions. The illustrated modules may also be associated with calibration engines configured for checking the accuracy of virtual system slide trajectories of autonomous vehicle 120 versus actual slide trajectories experienced during operation, and calibrating sensors and computations where needed. The system may also include databases configured to store the large amount of data associated with virtual and actual slip trajectories for autonomous vehicle 120. Additional engines or processing modules may also be included, such as an operator behavior modeling engine associated with manned vehicle 140, a simulation engine associated with autonomous vehicle 120, and other machine learning or artificial intelligence engines or processing modules. A virtual system modeling engine included with one or more of the modules may be used to precisely model and mirror the actual trajectories of manned vehicle 140 and autonomous vehicle 120, based on physics-based equations, historical data, and/or empirical data derived from monitoring the behavior of similar vehicles operating on the same or similar terrain under the same or similar conditions. Analytics engines associated with each of the modules can be configured to generate predicted data for the monitored systems and analyze differences between the predicted data and the real-time data received from the various sensors.

Real-time data on the trajectory of manned vehicle 140, as generated by manned vehicle trajectory determination module 210, and on projected slide trajectories of autonomous vehicle 120, as generated by autonomous vehicle trajectory determination module 220 can be passed to a comparison engine of comparison module 230 for performing real time comparison of projected slide trajectories for autonomous vehicle 120 with simultaneous manned vehicle positions along path 142 for manned vehicle 140. In some implementations, the comparison engine may be configured to continuously compare the real-time data with predicted values generated by a virtual system modeling engine or another simulation engine included as part of one or more of the modules or as a separate module. Based on the comparison, the comparison engine can be further configured to determine whether potential conflicts between a projected slide trajectory of autonomous vehicle 120 and a position of manned vehicle 140 are identified. Any identified potential conflicts can then be communicated to an autonomous vehicle command control module 240 configured for slowing autonomous vehicle 120 to remove the risk of a collision between autonomous vehicle 120 and manned vehicle 140.

A control system for preventing vehicle collisions, according to various embodiments of this disclosure, may include vehicle location information determination module 212, terrain determination module 222, and terrain surface coefficient of friction estimation module 224. Terrain surface coefficient of friction estimation module 224 may include or be associated with a sensing system configured to generate signals indicative of data representing one or more of vehicle speed, vehicle pose, vehicle size, vehicle weight, vehicle tire type, vehicle load, vehicle gear ratio, weather characteristics, and road conditions for a vehicle operating at a job site.

The control system may also include manned vehicle trajectory determination module 210 configured to receive location information from vehicle location information determination module 212 and plot a first travel path for manned vehicle 140, shown in FIG. 1, based at least in part on a location, heading, and speed of the manned vehicle and a desired destination for the manned vehicle. Autonomous vehicle trajectory determination module 220 may also be configured to receive location information from vehicle location information determination module 212. In addition, autonomous vehicle trajectory determination module 220 may be configured to receive terrain information from terrain determination module 222, and terrain surface coefficient of friction information from terrain surface coefficient of friction estimation module 224, and plot second travel path 122 for autonomous vehicle 120 from a location of the autonomous vehicle to a desired destination for the autonomous vehicle. Module 220 may also be configured to determine projected slide trajectories 132, 134, 136, 138 for autonomous vehicle 120 at successive positions along second travel path 122 where the autonomous vehicle is predicted to lose traction based at least in part on signals received from the sensing system.

Comparison module 230 may be configured to determine if any of the projected slide trajectories for autonomous vehicle 120 conflict with simultaneous positions of manned vehicle 140 traveling along first travel path 142. Autonomous vehicle command control module 240 may be configured to change an operating characteristic of autonomous vehicle 120 if the comparison module identifies any potential contact between the autonomous vehicle and the manned vehicle. In some exemplary embodiments, autonomous vehicle command control module 240 may be configured to lower a speed of autonomous vehicle 140 if the comparison module identifies any potential contact between autonomous vehicle 120 and manned vehicle 140.

The control system according to various exemplary embodiments of this disclosure may also include autonomous vehicle trajectory determination module 220 configured to receive data on one or more of a pitch and a grade of second travel path 122 from terrain determination module 222 and data on a terrain surface coefficient of friction of second travel path 122 from terrain surface coefficient of friction estimation module 224. This data may be used by autonomous vehicle trajectory determination module 220 to determine a lateral acceleration of autonomous vehicle 120 at each of predetermined intervals of time corresponding to each of the successive positions of the autonomous vehicle along the second travel path based on a projected autonomous vehicle speed and radius of curvature of the second travel path at each of the successive positions along the second travel path.

Autonomous vehicle trajectory determination module 220 may be further configured to calculate a lateral acceleration limit value ($\alpha$) according to the function:

$$\alpha = V_t^2 / R,$$

wherein $V_t$ is a target autonomous vehicle speed at or below which autonomous vehicle 120 is predicted to maintain traction with the terrain surface and R is the radius of curvature of second travel path 122 at each of the successive positions of the autonomous vehicle traveling along the second travel path. Module 220 may be configured to determine whether the lateral acceleration of autonomous vehicle 120 at each of the successive positions of the autonomous vehicle along the second travel path exceeds the lateral acceleration limit value ($\alpha$) above which the autonomous vehicle is predicted to lose traction with the terrain surface. Autonomous vehicle trajectory determination module 220 may be still further configured to determine the curvature (C) of second travel path 120 at each of the successive positions along the second travel path to be equal to the reciprocal of the radius of curvature (R) of the second travel path at each of the successive positions of the autonomous vehicle traveling along the second travel path, and predict the target speed $V_t$ according to the function:

$$V_t = \sqrt{\alpha/C}.$$

Terrain surface coefficient of friction estimation module 224 may be configured to calculate the data on a terrain surface coefficient of friction of second travel path 120 using signals generated by the sensing system that are indicative of terrain surface coefficient of friction input data representing one or more of pose of the autonomous vehicle, size of the autonomous vehicle, weight of the autonomous vehicle, tire type on the autonomous vehicle, load carried by the autonomous vehicle, gear ratio of the autonomous vehicle, weather characteristics, and road conditions for the second travel path encountered by the autonomous vehicle operating at the job site.

Various modules of the control system according to some exemplary embodiments of this disclosure, such as terrain surface coefficient of friction estimation module 224, and autonomous vehicle trajectory determination module 220, may include a machine learning engine. The machine learning engine may be configured to receive training data comprising historically or empirically derived values for input data representing one or more of physical or operational characteristics of a second autonomous vehicle that are approximately the same as corresponding physical or operational characteristics of the autonomous vehicle such as pose, size, weight, tire type, load, gear ratio, weather characteristics, and road conditions for the second autonomous vehicle traveling along at least one of the second travel path or a travel path with approximately the same pitch, grade, and other characteristics as the second travel path.

Physical or operational characteristics that are "approximately the same" refers to a selection of characteristics affecting the behavior of the second autonomous vehicle that have been shown historically, empirically, and/or through the implementation of physics-based equations to result in loss of traction and slide characteristics of an autonomous vehicle that fall within normally accepted tolerances for avoiding risk of collision with another vehicle or object. The training data may also include a plurality of historically or empirically derived slide trajectories of the second autonomous vehicle associated with the historically or empirically derived input data.

The machine learning engine may be configured to train a learning system using the training data to generate a plurality of projected slide trajectories of the autonomous vehicle at each of the successive positions along the second travel path based on real time values for the input data using a learning function including at least one learning parameter. Training of the learning system may include providing the training data as an input to the learning function, with the learning function being configured to use the at least one learning parameter to generate the plurality of projected slide trajectories based on the real time input data. The training may also include causing the learning function to generate the plurality of projected slide trajectories based on the real time input data, and comparing the projected slide trajectories based on the real time input data to the plurality of historically or empirically derived slide trajectories of the second autonomous vehicle to determine differences between the projected slide trajectories and the plurality of historically or empirically derived slide trajectories. The training may still further include modifying the at least one learning parameter to decrease the differences responsive to the differences being greater than threshold differences. In various alternative implementations, the learning system may include at least one of a neural network, a support vector machine, or a Markov decision process engine.

Autonomous vehicle trajectory determination module 220 may be configured to determine the projected slide trajectories 132, 134, 136, 138 for autonomous vehicle 120 as "slip polygons" extending from each of the successive positions along second travel path 122 where the autonomous vehicle is predicted to lose traction in a direction substantially tangent to the second travel path at the successive position. Each slip polygon may have a width dimension that is a function of a width dimension of the autonomous vehicle and a length dimension that is a function of at least the speed of the autonomous vehicle when it loses traction and a terrain surface coefficient of friction.

The machine learning engine may be configured to implement pattern/sequence recognition into a real-time decision loop that, e.g., is enabled by machine learning. The types of machine learning implemented by the various engines of one or more of the modules according to this disclosure may include various approaches to learning and pattern recognition. The machine learning may include the implementation of associative memory, which allows storage, discovery, and retrieval of learned associations between extremely large numbers of attributes in real time. At a basic level, implementation of associative memory stores information about how attributes and their respective features occur together. In particular, in various implementations according to this disclosure, a machine learning engine may implement associative memory that stores information about attributes such as slide trajectories of various machines and vehicles with different characteristics operating on different surfaces under different conditions, and respective features characterizing those attributes. The predictive power of the associative memory technology comes from its ability to interpret and analyze these co-occurrences and to produce various metrics. Associative memory is built through "experiential" learning in which each newly observed state is accumulated in the associative memory as a basis for interpreting future events. Thus, by observing normal system operation over time, and the normal predicted system operation over time, the associative memory is able to learn normal patterns as a basis for identifying non-normal behavior and appropriate responses of the various modules, associate the patterns with particular outcomes, contexts or responses, and determine, for example, the likelihood of conflict between a slip trajectory of an autonomous vehicle operating at a target speed determined to maximize the speed and productivity of the autonomous vehicle while minimizing the risk of collision with the manned vehicle.

The machine learning algorithms incorporated into one or more of the modules according to this disclosure may also assist in uncovering potential combinations of factors and conditions that may lead to slip trajectories for autonomous vehicle 120 falling outside of an acceptable level of risk of collision with manned vehicle 140. Machine learning algorithms and artificial intelligence may be particularly useful in processing the large amounts of data acquired over time from operating many different types of vehicles on many different terrains under many different conditions. The amount of information is so great that an "intelligent" system employing machine learning algorithms may be useful in recommending possible alterations to vehicle physical or operating characteristics under different ground surface conditions for the purpose of maximizing speed and productivity of autonomous vehicles while minimizing risk of collision with manned vehicles. Through the application of the machine learning algorithms and virtual system modeling according to various embodiments of this disclosure, by observing simulations of various outcomes determined by different vehicle characteristics, different road repair or maintenance operations, and different vehicle operational parameters, and by comparing them to actual system responses, it may be possible to improve the simulation process, thereby allowing for continual improvements in productivity and safety.

In some embodiments, the machine learning engine may include a neural network. The neural network can include a plurality of layers each including one or more nodes, such as a first layer (e.g., an input layer), a second layer (e.g., an output layer), and one or more hidden layers. The neural network can include characteristics such as weights and biases associated with computations that can be performed between nodes of layers. The machine learning engine can be configured to train the neural network by providing the first input conditions to the first layer of the neural network. The neural network can generate a plurality of first outputs based on the first input conditions, such as by executing computations between nodes of the layers. The machine learning engine can receive the plurality of first outputs, and modify a characteristic of the neural network to reduce a difference between the plurality of first outputs, for example, slide trajectories determined from historical or empirical data, and a plurality of slide trajectories measured under real time conditions.

In some embodiments, the learning system may include a classification engine, such as a support vector machine (SVM). The SVM can be configured to generate a mapping of first input conditions to a first set of slide trajectories for an autonomous vehicle. For example, the machine learning engine may be configured to train the SVM to generate one or more rules configured to classify training pairs (e.g., each first input condition and its corresponding effect on a resulting slide trajectory). The classification of training pairs can enable the mapping of first input conditions to first slide trajectories by classifying particular first slide trajectories as corresponding to particular first input conditions. Once trained, the machine learning engine can generate predicted slide trajectories based on a second set of input conditions by applying the mapping or classification to the second set of input conditions.

In some embodiments, the machine learning engine may include a Markov decision process engine. The machine learning engine may be configured to train the Markov decision process engine to determine a policy based on the training data, the policy indicating, representing, or resembling how a particular autonomous vehicle would behave in response to various input conditions. The machine learning engine can provide the first input conditions to the Markov decision process engine as a set or plurality of states (e.g., a set or plurality of finite states). The machine learning engine can provide first slide trajectories to the Markov decision process as a set or plurality of actions (e.g., a set or plurality of finite actions). The machine learning engine can execute the Markov decision process engine to determine the policy that best represents the relationship between the first input conditions and first slide trajectories. It will be appreciated that in various embodiments, the machine learning engine can include various other machine learning engines and algorithms, as well as combinations of machine learning engines and algorithms, that can be executed to determine a relationship between the plurality of first input conditions and the plurality of first predicted slide trajectories and thus train the machine learning engines.

Each of the modules illustrated in FIG. 2 may include a controller, which may comprise one or more processors and one or more memory devices. The various functions performed by each module are enabled and implemented by various combinations of hardware and software associated with the one or more processors and one or more memory devices, which result in special purpose structural distinctions to each module. In some embodiments, each module may also include a controller configured to communicate with a receiver to receive from an offboard system information on surface conditions, vehicle characteristics, weather predictions, and historical information relevant to a particular travel path currently being traversed by a particular autonomous vehicle.

In one exemplary embodiment, one or more modules may include a controller configured to group or classify data characterizing various machine operational parameters acquired empirically at a particular job site over a long period of time, by a variety of different machines, and under a large variety of different conditions. The data may be stored in one or more memory devices as a reference database, and may include values pertaining to rolling resistance, wheel slip ratio, vehicle velocity, and vehicle pose (including pitch, roll, and yaw) under different job site surface conditions and at different locations calculated for various types of vehicles operating at the job site. One or more processors of one or more modules may be configured and programmed in order to result in one or more special purpose processors that are configured to classify the data collected from each job site, with or without actual human operator input, and predict the existence of soft underfoot conditions or other surface conditions that affect slip trajectories. In various exemplary embodiments, a controller for a module may be configured and programmed to analyze real time data received from various sensors on a machine, utilize machine learning techniques in order to train a classifier using the data gathered by various vehicles operating at job sites, compare the analyzed data with predetermined threshold values for various parameters, identify any trends or patterns in the real time data, and generate appropriate command control signals to change ways in which the machine operates in a manner designed to maximize speed and productivity of the autonomous vehicle while minimizing any risk of collision with a manned vehicle.

Autonomous vehicle command control module 240 may be configured to send command control signals to various operational devices such as solenoids, pumps, valves, motors, and switches to effect changes in gear ratios, flow rates and flow directions for various operational fluids, fuel injection timing and duration, throttle position, voltage, current, and/or power outputs associated with various electrical power sources, ignition timing, brake controls, and/or steering controls. In some instances, the command control signals from module 240 may cause autonomous vehicle 120 to slow down to a target speed, at or below which any prediction of conflict between a slide trajectory for autonomous vehicle 120 and a position of manned vehicle 140 traveling along path 142 is eliminated. Alternatively or in addition, module 240 may be configured to adjust braking characteristics, drive train gear ratios, power output, or other operating characteristics or parameters of autonomous vehicle 120.

INDUSTRIAL APPLICABILITY

The disclosed embodiments of a system for avoiding vehicle collisions are applicable for implementing a method for preventing vehicle collisions, such as when an autonomous vehicle is traveling along a curved path adjacent to a curved path being traversed by a manned vehicle. The disclosed systems and methods are applicable, for example, at job sites such as mining sites, where large haul trucks and other mining vehicles travel back and forth between locations where loaders are digging up minerals from the ground and loading the minerals into the haul trucks, and locations where the minerals are dumped from the haul trucks for further processing or transport to other locations. As more autonomous vehicles are employed in these endeavors, particularly at remote mining sites, safety of humans operating manned vehicles in the same locations is of paramount concern. A goal during operations at these mining sites or other locations where both autonomous vehicles and manned vehicles are operating in the same vicinity is to maximize the speed and productivity of the autonomous vehicles, while minimizing any risk of collisions between the autonomous vehicles and manned vehicles.

Methods according to various implementations of this disclosure may include determining a vehicle location, using a vehicle location information determination module 212. Such a vehicle location information determination module may be located remotely, off board the vehicle, or on board the vehicle in the form of devices such as GPS receivers. The method may include determining a terrain on which an autonomous vehicle is operating, using a terrain determination module 222, estimating a terrain surface coefficient of friction, using a terrain surface coefficient of friction estimation module 224, and generating signals indicative of data representing one or more of vehicle speed, vehicle pose, vehicle size, vehicle weight, vehicle tire type, vehicle load, vehicle gear ratio, weather characteristics, and road conditions for an autonomous vehicle operating at a job site, using a sensing system. An exemplary method according to this disclosure includes receiving location information of a manned vehicle 140 from the vehicle location information determination module and plotting a first travel path 142 for manned vehicle 140 based at least in part on a location, heading, and speed of the manned vehicle and a desired destination for the manned vehicle, using a manned vehicle trajectory determination module. The travel path traversed by the manned vehicle is generally known to all of the other vehicles operating at the job site, including autonomous vehicles, which are provided with real time information on the precise location of the manned vehicle as it traverses its travel path.

Various implementations of methods according to this disclosure may also include receiving location information of an autonomous vehicle 120 from the vehicle location information determination module 212, and terrain information regarding the terrain of a second travel path 122 along which autonomous vehicle 120 is traveling, from terrain determination module 222. Additionally, terrain surface coefficient of friction information may be provided by terrain surface coefficient of friction estimation module 224. Autonomous vehicle trajectory determination module 220 may be employed for plotting second travel path 122 for autonomous vehicle 120 from a location of the autonomous vehicle to a desired destination for the autonomous vehicle, and determining projected slide trajectories 132, 134, 136, 138 for autonomous vehicle 120 at successive positions along second travel path 122 where the autonomous vehicle may be predicted to lose traction based at least in part on signals received from the sensing system.

An exemplary method according to this disclosure may also include determining if any of the projected slide trajectories for autonomous vehicle 120 conflict with simultaneous positions of manned vehicle 140 traveling along first travel path 142, using a comparison module 230. An operating characteristic of autonomous vehicle 120 may be changed if comparison module 230 identifies any potential contact between autonomous vehicle 120 and manned vehicle 140, using autonomous vehicle command control module 240. In particular, a speed of autonomous vehicle 120 may be lowered using autonomous vehicle command control module 240 if comparison module 230 identifies any potential contact between autonomous vehicle 120 and manned vehicle 140.

A method for avoiding collisions between autonomous vehicle 120 and manned vehicle 140 may still further include receiving data at autonomous vehicle trajectory determination module 220 on one or more of a pitch and a grade of second travel path 122 from terrain determination module 222, and on a terrain surface coefficient of friction of second travel path 122 from terrain surface coefficient of friction estimation module 224. A lateral acceleration of autonomous vehicle 120 may be determined using autonomous vehicle trajectory determination module 220 at each of predetermined intervals of time corresponding to each of the successive positions of autonomous vehicle 120 along second travel path 122 based on a projected autonomous vehicle speed and radius of curvature of second travel path 122 at each of the successive positions along second travel path 122.

An exemplary implementation of a method for avoiding collisions may further include calculating, using autonomous vehicle trajectory determination module 220, a lateral acceleration limit value ($\alpha$) according to the function:

$$\alpha = V_t^2/R,$$

wherein $V_t$ is a target autonomous vehicle speed at or below which the autonomous vehicle is predicted to maintain traction with the terrain surface and R is the radius of curvature of second travel path 122 at each of the successive positions of autonomous vehicle 120 traveling along second travel path 122. The method may further include determining, using autonomous vehicle trajectory determination module 220, whether the actual lateral acceleration of autonomous vehicle 120 at each of the successive positions of the autonomous vehicle along second travel path 122 exceeds the lateral acceleration limit value ($\alpha$), above which the autonomous vehicle is predicted to lose traction with the terrain surface.

An exemplary implementation of the method may also include determining, using autonomous vehicle trajectory determination module 220, the curvature (C) of second travel path 122 at each of the successive positions along the second travel path to be equal to the reciprocal of the radius of curvature (R) of the second travel path at each of the successive positions of the autonomous vehicle traveling along the second travel path. Target autonomous vehicle speed $V_t$ may be predicted according to the function:

$$V_t = \sqrt{\alpha/C}.$$

Data on a terrain surface coefficient of friction of second travel path 122 may be calculated, using terrain surface coefficient of friction estimation module 224. The data signals generated by the sensing system are indicative of terrain surface coefficient of friction input data representing one or more of pose of the autonomous vehicle, size of the autonomous vehicle, weight of the autonomous vehicle, tire type on the autonomous vehicle, load carried by the autonomous vehicle, gear ratio of the autonomous vehicle, weather characteristics, and road conditions for the second travel path encountered by the autonomous vehicle operating at the job site. The terrain surface coefficient of friction input data may be used by module 224 in various physics-based equations and/or through comparisons to maps or other databases that provide relationships between factors such as the input data and the coefficient of friction between a surface, such as the second travel path 122, and a vehicle traveling over the travel path, such as autonomous vehicle 120. The determined coefficient of friction may be used by autonomous vehicle trajectory determination module 220 in determining the lateral acceleration limit value ($\alpha$) for a particular autonomous vehicle and travel path, and hence a target autonomous vehicle speed $V_t$, according to the function referenced above.

In some alternative implementations of methods according to this disclosure, terrain surface coefficient of friction estimation module 224, autonomous vehicle trajectory determination module 220, and/or other modules according to this disclosure, may include one or more machine learning engines or other forms of artificial intelligence. An exemplary machine learning engine may receive training data comprising historically or empirically derived values for input data representing one or more of physical or operational characteristics of a second autonomous vehicle that are approximately the same as corresponding physical or operational characteristics of the autonomous vehicle being tracked in real time. The physical and operational characteristics may include vehicle pose, vehicle size, vehicle weight, vehicle tire type, vehicle load, gear ratio of a transmission for the vehicle, weather characteristics experienced by the vehicle during operation, and road conditions for the second autonomous vehicle traveling along at least one of the same second travel path as is being currently traversed by an autonomous vehicle, or a travel path with approximately the same pitch, grade, and other characteristics as the second travel path. The training data may also include a plurality of historically or empirically derived slide trajectories of the second autonomous vehicle associated with the historically or empirically derived input data.

An exemplary machine learning engine may train a learning system using the training data to generate a plurality of projected slide trajectories of autonomous vehicle 120 at each of the successive positions along second travel path 122 based on real time values for the input data using a learning function including at least one learning parameter. The training of the learning system may include providing the training data as an input to the learning function, with the learning function being configured to use the at least one learning parameter to generate the plurality of projected slide trajectories based on the real time input data. The training may further include causing the learning function to generate the plurality of projected slide trajectories based on the real time input data, and comparing the projected slide trajectories based on real time input data to the plurality of historically or empirically derived slide trajectories to determine differences between the projected slide trajectories and the plurality of historically or empirically derived slide trajectories. Upon identifying any differences between the projected slide trajectories and the plurality of historically or empirically derived slide trajectories, the training may include modifying the at least one learning parameter to decrease the differences responsive to the differences being greater than threshold differences. In various exemplary embodiments of the machine learning engines, a learning system may include at least one of a neural network, a support vector machine, or a Markov decision process engine.

The various implementations of methods according to this disclosure may include determining the projected slide trajectories for autonomous vehicle 120 as slip polygons 132, 134, 136, 138 extending from each of the successive positions along second travel path 122 where autonomous vehicle 120 is predicted to lose traction in a direction substantially tangent to second travel path 122 at each of the successive positions. Each slip polygon may have a width dimension that is a function of a width dimension of the autonomous vehicle and a length dimension that is a function of at least the speed of the autonomous vehicle when it loses traction and a terrain surface coefficient of friction for travel path 122 and the ground surface over which autonomous vehicle 120 is sliding.

It will be apparent to those skilled in the art that various modifications and variations can be made to the system of the present disclosure without departing from the scope of the disclosure. Other embodiments will be apparent to those skilled in the art from consideration of the specification and practice of the system and methods disclosed herein. It is intended that the specification and examples be considered as exemplary only, with a true scope of the disclosure being indicated by the following claims and their equivalent.

What is claimed is:

1. A control system for preventing vehicle collisions, the control system comprising:
   a vehicle location information determination module;
   a terrain determination module;
   a terrain surface coefficient of friction estimation module;
   a sensing system configured to generate signals indicative of data representing one or more of vehicle speed, vehicle pose, vehicle size, vehicle weight, vehicle tire type, vehicle load, vehicle gear ratio, weather characteristics, and road conditions for a vehicle operating at a job site;
   a manned vehicle trajectory determination module configured to receive location information from the vehicle location information determination module and plot a first travel path for a manned vehicle based at least in part on a location, heading, and speed of the manned vehicle and a desired destination for the manned vehicle;
   an autonomous vehicle trajectory determination module configured to receive location information from the vehicle location information determination module, terrain information from the terrain determination module, and terrain surface coefficient of friction information from the terrain surface coefficient of friction estimation module, plot a second travel path for an autonomous vehicle from a location of the autonomous vehicle to a desired destination for the autonomous vehicle, and determine projected slide trajectories for the autonomous vehicle at successive positions along the second travel path where the autonomous vehicle is predicted to lose traction based at least in part on signals received from the sensing system;
   a comparison module configured to determine if any of the projected slide trajectories for the autonomous vehicle conflict with simultaneous positions of the manned vehicle traveling along the first travel path; and
   an autonomous vehicle command control module configured to change an operating characteristic of the autonomous vehicle if the comparison module identifies any potential contact between the autonomous vehicle and the manned vehicle.

2. The control system according to claim 1, wherein the autonomous vehicle command control module is configured to lower a speed of the autonomous vehicle if the comparison module identifies any potential contact between the autonomous vehicle and the manned vehicle.

3. The control system according to claim 1, wherein the autonomous vehicle trajectory determination module is further configured to:
   receive data on one or more of a pitch and a grade of the second travel path from the terrain determination module and data on a terrain surface coefficient of friction of the second travel path from the terrain surface coefficient of friction estimation module; and
   determine a lateral acceleration of the autonomous vehicle at each of predetermined intervals of time corresponding to each of the successive positions of the autonomous vehicle along the second travel path based on a projected autonomous vehicle speed and radius of curvature of the second travel path at each of the successive positions along the second travel path.

4. The control system according to claim 3, wherein the autonomous vehicle trajectory determination module is further configured to:
   calculate a lateral acceleration limit value ($\alpha$) according to the function:

$\alpha = V_t^2/R$, wherein $V_t$ is a target autonomous vehicle speed at or below which the autonomous vehicle is predicted to maintain traction with the terrain surface and R is the radius of curvature of the second travel path at each of the successive positions of the autonomous vehicle traveling along the second travel path; and
   determine whether the lateral acceleration of the autonomous vehicle at each of the successive positions of the autonomous vehicle along the second travel path exceeds the lateral acceleration limit value ($\alpha$) above which the autonomous vehicle is predicted to lose traction with the terrain surface.

5. The control system according to claim 4, wherein the autonomous vehicle trajectory determination module is further configured to determine the curvature (C) of the second travel path at each of the successive positions along the second travel path to be equal to the reciprocal of the radius of curvature (R) of the second travel path at each of the successive positions of the autonomous vehicle traveling along the second travel path, and predict the target speed $V_t$ according to the function:

$$V_t = \sqrt{\alpha/C}.$$

6. The control system according to claim 3, wherein the terrain surface coefficient of friction estimation module is configured to calculate the data on a terrain surface coefficient of friction of the second travel path using signals generated by the sensing system that are indicative of terrain surface coefficient of friction input data representing one or more of pose of the autonomous vehicle, size of the autonomous vehicle, weight of the autonomous vehicle, tire type on the autonomous vehicle, load carried by the autonomous vehicle, gear ratio of the autonomous vehicle, weather characteristics, and road conditions for the second travel path encountered by the autonomous vehicle operating at the job site.

7. The control system according to claim 6, wherein the terrain surface coefficient of friction estimation module includes a machine learning engine configured to:
  receive training data comprising historically or empirically derived values for input data representing one or more of physical or operational characteristics of a second autonomous vehicle that are approximately the same as corresponding physical or operational characteristics of the autonomous vehicle such as pose, size, weight, tire type, load, gear ratio, weather characteristics, and road conditions for the second autonomous vehicle traveling along at least one of the second travel path or a travel path with approximately the same pitch, grade, and other characteristics as the second travel path, and a plurality of historically or empirically derived slide trajectories of the second autonomous vehicle associated with the historically or empirically derived input data;
  train a learning system using the training data to generate a plurality of projected slide trajectories of the autonomous vehicle at each of the successive positions along the second travel path based on real time values for the input data using a learning function including at least one learning parameter, wherein training the learning system includes:
  providing the training data as an input to the learning function, the learning function being configured to use the at least one learning parameter to generate the plurality of projected slide trajectories based on the real time input data;
  causing the learning function to generate the plurality of projected slide trajectories based on the real time input data;
  comparing the projected slide trajectories based on the real time input data to the plurality of historically or empirically derived slide trajectories of the second autonomous vehicle to determine differences between the projected slide trajectories and the plurality of historically or empirically derived slide trajectories; and
  modifying the at least one learning parameter to decrease the differences responsive to the differences being greater than threshold differences.

8. The control system according to claim 7, wherein the learning system includes at least one of a neural network, a support vector machine, or a Markov decision process engine.

9. The control system according to claim 1, wherein the autonomous vehicle trajectory determination module is configured to determine the projected slide trajectories for the autonomous vehicle as slip polygons extending from each of the successive positions along the second travel path where the autonomous vehicle is predicted to lose traction in a direction substantially tangent to the second travel path at the successive position, each slip polygon having a width dimension that is a function of a width dimension of the autonomous vehicle and a length dimension that is a function of at least the speed of the autonomous vehicle when it loses traction and a terrain surface coefficient of friction.

10. A method for preventing vehicle collisions, the method comprising:
  determining a vehicle location, using a vehicle location information determination module;
  determining a terrain on which the vehicle is operating, using a terrain determination module;
  estimating a terrain surface coefficient of friction, using a terrain surface coefficient of friction estimation module;
  generating signals indicative of data representing one or more of vehicle speed, vehicle pose, vehicle size, vehicle weight, vehicle tire type, vehicle load, vehicle gear ratio, weather characteristics, and road conditions for a vehicle operating at a job site, using a sensing system;
  receiving location information of a manned vehicle from the vehicle location information determination module and plotting a first travel path for the manned vehicle based at least in part on a location, heading, and speed of the manned vehicle and a desired destination for the manned vehicle, using a manned vehicle trajectory determination module;
  receiving location information of an autonomous vehicle from the vehicle location information determination module, terrain information from the terrain determination module, and terrain surface coefficient of friction information from the terrain surface coefficient of friction estimation module, plotting a second travel path for the autonomous vehicle from a location of the autonomous vehicle to a desired destination for the autonomous vehicle, and determining projected slide trajectories for the autonomous vehicle at successive positions along the second travel path where the autonomous vehicle is predicted to lose traction based at least in part on signals received from the sensing system, using an autonomous vehicle trajectory determination module;
  determining if any of the projected slide trajectories for the autonomous vehicle conflict with simultaneous positions of the manned vehicle traveling along the first travel path, using a comparison module; and
  changing an operating characteristic of the autonomous vehicle if the comparison module identifies any potential contact between the autonomous vehicle and the manned vehicle, using an autonomous vehicle command control module.

11. The method according to claim 10, further including lowering a speed of the autonomous vehicle if the comparison module identifies any potential contact between the autonomous vehicle and the manned vehicle, using the autonomous vehicle command control module.

12. The method according to claim 10, further including:
receiving data at the autonomous vehicle trajectory determination module on one or more of a pitch and a grade of the second travel path from the terrain determination module and on a terrain surface coefficient of friction of the second travel path from the terrain surface coefficient of friction estimation module; and
determining, using the autonomous vehicle trajectory determination module, a lateral acceleration of the autonomous vehicle at each of predetermined intervals of time corresponding to each of the successive positions of the autonomous vehicle along the second travel path based on a projected autonomous vehicle speed and radius of curvature of the second travel path at each of the successive positions along the second travel path.

13. The method according to claim 12, further including:
calculating, using the autonomous vehicle trajectory determination module, a lateral acceleration limit value ($\alpha$) according to the function:

$$\alpha = V_t^2/R,$$

wherein $V_t$ is a target autonomous vehicle speed at or below which the autonomous vehicle is predicted to maintain traction with the terrain surface and R is the radius of curvature of the second travel path at each of the successive positions of the autonomous vehicle traveling along the second travel path; and
determining, using the autonomous vehicle trajectory determination module, whether the lateral acceleration of the autonomous vehicle at each of the successive positions of the autonomous vehicle along the second travel path exceeds the lateral acceleration limit value ($\alpha$) above which the autonomous vehicle is predicted to lose traction with the terrain surface.

14. The method according to claim 13, further including:
determining, using the autonomous vehicle trajectory determination module, the curvature (C) of the second travel path at each of the successive positions along the second travel path to be equal to the reciprocal of the radius of curvature (R) of the second travel path at each of the successive positions of the autonomous vehicle traveling along the second travel path; and
predicting the target speed $V_t$ according to the function:

$$V_t = \sqrt{\alpha}/C.$$

15. The method according to claim 12, further including:
calculating, using the terrain surface coefficient of friction estimation module, the data on a terrain surface coefficient of friction of the second travel path using signals generated by the sensing system that are indicative of terrain surface coefficient of friction input data representing one or more of pose of the autonomous vehicle, size of the autonomous vehicle, weight of the autonomous vehicle, tire type on the autonomous vehicle, load carried by the autonomous vehicle, gear ratio of the autonomous vehicle, weather characteristics, and road conditions for the second travel path encountered by the autonomous vehicle operating at the job site.

16. The method according to claim 15, further including:
receiving training data at a machine learning engine of the terrain surface coefficient of friction estimation module, the training data comprising historically or empirically derived values for input data representing one or more of physical or operational characteristics of a second autonomous vehicle that are approximately the same as corresponding physical or operational characteristics of the autonomous vehicle such as pose, size, weight, tire type, load, gear ratio, weather characteristics, and road conditions for the second autonomous vehicle traveling along at least one of the second travel path or a travel path with approximately the same pitch, grade, and other characteristics as the second travel path, and a plurality of historically or empirically derived slide trajectories of the second autonomous vehicle associated with the historically or empirically derived input data;
training a learning system using the training data to generate a plurality of projected slide trajectories of the autonomous vehicle at each of the successive positions along the second travel path based on real time values for the input data using a learning function including at least one learning parameter, wherein training the learning system includes:
providing the training data as an input to the learning function, the learning function being configured to use the at least one learning parameter to generate the plurality of projected slide trajectories based on the real time input data;
causing the learning function to generate the plurality of projected slide trajectories based on the real time input data;
comparing the projected slide trajectories based on real time input data to the plurality of historically or empirically derived slide trajectories to determine differences between the projected slide trajectories and the plurality of historically or empirically derived slide trajectories; and
modifying the at least one learning parameter to decrease the differences responsive to the differences being greater than threshold differences.

17. The method according to claim 16, wherein the learning system includes at least one of a neural network, a support vector machine, or a Markov decision process engine.

18. The method according to claim 10, further including:
determining the projected slide trajectories for the autonomous vehicle as slip polygons extending from each of the successive positions along the second travel path where the autonomous vehicle is predicted to lose traction in a direction substantially tangent to the second travel path at the successive position, each slip polygon having a width dimension that is a function of a width dimension of the autonomous vehicle and a length dimension that is a function of at least the speed of the autonomous vehicle when it loses traction and a terrain surface coefficient of friction.

19. A computer-readable medium for use in preventing collisions between an autonomous vehicle and a manned vehicle traveling along adjacent, curved travel paths at a job site, the computer-readable medium including computer-executable instructions for performing a method comprising:
determining locations of the autonomous vehicle and the manned vehicle, using a vehicle location information determination module;
determining a terrain on which the autonomous vehicle is operating, using a terrain determination module;
estimating a terrain surface coefficient of friction for the autonomous vehicle, using a terrain surface coefficient of friction estimation module;

generating signals using a sensing system, the signals being indicative of data representing one or more of autonomous vehicle physical and operating characteristics including speed, pose, size, weight, tire type, load, gear ratio, weather characteristics, and road conditions for the travel path along which the autonomous vehicle is operating;

receiving location information for the manned vehicle from the vehicle location determination module and plotting a first travel path for the manned vehicle based at least in part on the location, heading, and speed of the manned vehicle and a desired destination for the manned vehicle, using a manned vehicle trajectory determination module;

receiving location information for the autonomous vehicle from the vehicle location determination module, terrain information from the terrain determination module, and terrain surface coefficient of friction information from the terrain surface coefficient of friction estimation module, plotting a second travel path for the autonomous vehicle from a location of the autonomous vehicle to a desired destination for the autonomous vehicle, and determining projected slide trajectories for the autonomous vehicle at successive positions along the second travel path where the autonomous vehicle is predicted to lose traction based at least in part on signals received from the sensing system, using an autonomous vehicle trajectory determination module;

determining if any of the projected slide trajectories for the autonomous vehicle conflict with simultaneous positions of the manned vehicle traveling along the first travel path, using a comparison module; and changing an operating characteristic of the autonomous vehicle if the comparison module identifies any potential contact between the autonomous vehicle and the manned vehicle, using an autonomous vehicle command control module.

20. The computer-readable medium of claim 19, wherein the method further includes:

receiving data at the autonomous vehicle trajectory determination module on one or more of a pitch and a grade of the second travel path from the terrain determination module and on a terrain surface coefficient of friction of the second travel path from the terrain surface coefficient of friction estimation module;

determining, using the autonomous vehicle trajectory determination module, a lateral acceleration of the autonomous vehicle at each of predetermined intervals of time corresponding to each of the successive positions of the autonomous vehicle along the second travel path based on a projected autonomous vehicle speed and radius of curvature of the second travel path at each of the successive positions along the second travel path;

calculating, using the autonomous vehicle trajectory determination module, a lateral acceleration limit value ($\alpha$) according to the function:

$$\alpha = V_t^2/R,$$

wherein $V_t$ is a target autonomous vehicle speed at or below which the autonomous vehicle is predicted to maintain traction with the terrain surface and R is the radius of curvature of the second travel path at each of the successive positions of the autonomous vehicle traveling along the second travel path;

determining, using the autonomous vehicle trajectory determination module, whether the lateral acceleration of the autonomous vehicle at each of the successive positions of the autonomous vehicle along the second travel path exceeds the lateral acceleration limit value ($\alpha$) above which the autonomous vehicle is predicted to lose traction with the terrain surface determining, using the autonomous vehicle trajectory determination module, the curvature (C) of the second travel path at each of the successive positions along the second travel path to be equal to the reciprocal of the radius of curvature (R) of the second travel path at each of the successive positions of the autonomous vehicle traveling along the second travel path; and predicting the target speed $V_t$ according to the function:

$$V_t = \sqrt{\alpha}/C.$$

* * * * *